(12) United States Patent
Gaonkar et al.

(10) Patent No.: US 9,471,346 B2
(45) Date of Patent: *Oct. 18, 2016

(54) CATEGORIZING MEMORY PAGES BASED ON PAGE RESIDENCES

(71) Applicant: International Business Machines Corporation, Armonk, NY (US)

(72) Inventors: Chetan L. Gaonkar, Kumta (IN); Chidambar Y. Kulkarni, Bangalore (IN); Lakshmi Priya, Hyderabad (IN); Vamshi K. Thatikonda, Karimnagar (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,747

(22) Filed: May 24, 2016

(65) Prior Publication Data
US 2016/0253206 A1 Sep. 1, 2016

Related U.S. Application Data

(63) Continuation of application No. 15/069,259, filed on Mar. 14, 2016, which is a continuation of application No. 14/485,968, filed on Sep. 15, 2014.

(51) Int. Cl.
*G06F 12/00* (2006.01)
*G06F 9/455* (2006.01)
*G06F 9/48* (2006.01)

(52) U.S. Cl.
CPC ......... *G06F 9/45529* (2013.01); *G06F 9/4856* (2013.01)

(58) Field of Classification Search
USPC ....................................................... 711/153
See application file for complete search history.

(56) References Cited

U.S. PATENT DOCUMENTS

| 7,971,027 | B2 | 6/2011 | Fleming et al. |
| 8,712,984 | B2 | 4/2014 | Zhang et al. |
| 2011/0072234 | A1 | 3/2011 | Chinya et al. |
| 2013/0339568 | A1 | 12/2013 | Corrie |
| 2015/0378612 | A1* | 12/2015 | Bhat ............... G06F 3/0608 711/154 |
| 2016/0077965 | A1 | 3/2016 | Gaonkar et al. |

OTHER PUBLICATIONS

"Prior Identification of Potential duplicate pages for NFS mounted File system pages", Authors et al. Disclosed Anonymously, IP.com Prior Art Database Technical Disclosure, IPCOM000230915D, Sep. 18, 2013, pp. 1-13.
Gaonkar et al.; U.S. Appl. No. 15/069,259, filed Mar. 14, 2016; Entitled "Categorizing Memory Pages Based on Page Residences".
List of IBM Patents or Patent Applications Treated As Related; Dated Jun. 15, 2016; 2 pages.

* cited by examiner

*Primary Examiner* — Jared Rutz
*Assistant Examiner* — Hamdy S Ahmed
(74) *Attorney, Agent, or Firm* — Alexander G. Jochym

(57) ABSTRACT

Embodiments of the present invention provide hints for page stealing by prioritizing pages based on the number of residences. Receiving a plurality of pages to be hinted to a hypervisor for page stealing. Determining at least two page types of the plurality of pages. Determining whether any of the at least two page types has a total number of residences less than a total number of potential residences in the virtual environment for all page types and have a total number of residences less than a threshold. Responsive to determining a first page type of the at least two page types has a total number of residences less than a total number of potential residences for all page types and has a total number of residences less than a threshold, notifying the hypervisor of at least one page from the plurality of pages that is the determined first page type.

1 Claim, 4 Drawing Sheets

200

PAGING DEVICE TABLE ENTRY

Type of Device: (log, paging, remote file system, local file system)

Pending i/o Count i/o List Head i/o List Tail

Pager Strategy Routine Address

Readable Residences: X

Writeable Residences Y

Intermediate Arrival Count Just to Page Out: N

Varying Residence: Y/N

FIG. 2

CATEGORIZING MEMORY PAGES BASED ON PAGE RESIDENCES

BACKGROUND

The present disclosure relates generally to the field of memory virtualization, and more particularly to categorizing page types based on the number of residences for hypervisor page stealing.

In computing, virtual memory is a memory management technique that is implemented using both hardware and software. It maps memory addresses used by a program, called virtual addresses, into physical addresses in computer memory. In addition, paging is one of the memory management schemes by which a computer can store and retrieve data from secondary storage for use in main memory. In the paging memory management scheme, the operating system retrieves data from secondary storage in same-size blocks called pages. Paging allows operating systems to use secondary storage for data that does not fit into physical random-access memory (RAM).

Page tables are used to translate the virtual addresses seen by the application into physical addresses used by the hardware to process instructions and such hardware that handles this specific translation is often known as the memory management unit. Each entry in the page table holds a flag indicating whether the corresponding page is in real memory or in another location. The page table entry will contain the real memory address at which the page is stored. Systems can have one page table for the whole system, separate page tables for each application and segment, a tree of page tables for large segments, or a combination of these.

Active memory sharing (AMS) is a memory virtualization technology that allows multiple partitions to share a pool of physical memory. This is designed to increase system memory utilization, thereby enabling a user to realize a cost benefit by reducing the amount of physical memory required. When all physical memory is already in use, the paging supervisor, often called a hypervisor, must free a page in primary storage to hold the swapped-in page, or page that needs to be in physical memory. The hypervisor uses one of a variety of page replacement algorithms such as least recently used (LRU) or a kernel predetermine order like read-only file pages, dirty file pages, client pages, working pages, and klock pages to determine which page to free.

SUMMARY

Embodiments of the present invention include a method, computer program product, and system for providing hints for page stealing by prioritizing pages based on the number of residences for the pages in a virtual environment. In one embodiment, a plurality of pages that are candidates to be hinted to a hypervisor for page stealing is received. At least two page types of the plurality of pages is determined. Whether any of the at least two pages types has a total number of residences less than a total number of potential residences in the virtual environment for all page types and has a total number of residences less than a threshold is determined. Responsive to determining a first page type of the at least two page types has a total number of residence less than a total number of potential residences in the virtual environment for all page types and has a total number of residences less than a threshold, the hypervisor is notified of at least one page from the plurality of pages that is of the determined first page type.

BRIEF DESCRIPTION OF THE SEVERAL VIEWS OF THE DRAWINGS

FIG. 2 is an example of a paging device table entry in accordance with an embodiment of the present invention;

DETAILED DESCRIPTION

Collaborative memory manager (CMM) 130 provides hints to hypervisor 124 for page stealing in a virtual environment. However, currently these hints are determined by algorithms that don't take into account the number of residences of a page. An increased number of residences for a page allows for paging strategies of each residence to move the page multiple times and in the process, over utilizing a shared memory pool leading to bottle necks and slower system processing. Embodiments of the present invention recognize that by categorizing page types based upon the number of residences and then hinting to the hypervisor based upon the results, certain instances of page movements that can take up valuable system resources can be eliminated.

Embodiments of the present invention also recognize that applications are impacted by the operating system and hypervisor page stealing. The application's performance is impacted by both the steal time taken and also by the number of ways the stealing of the same page is happening at the same time. When an application is trying to access a piece of data, time is spent in managing memory and its content in different storage locations in the system and paging that piece of data into main memory. Pages can be stealed by multiple strategies (e.g., hypervisor paging strategies, Operating System "OS" paging strategies, NFS (Network Fie System) paging strategy, Persistent Data paging strategy, etc.) causing unnecessary movement of pages from one storage location to another storage location without gaining any benefit.

Embodiment of the present invention also recognize the following disadvantages: i) hypervisor thrashing in stealing of pages, ii) temporarily freeing pages in Main Memory to accommodate the page's movement from one location to another exerting capacity pressure on Main Memory, and iii) delays in moving a piece of data to a destination location due to transferring from source location to an intermediate location before reaching a final destination location.

Figure 1:
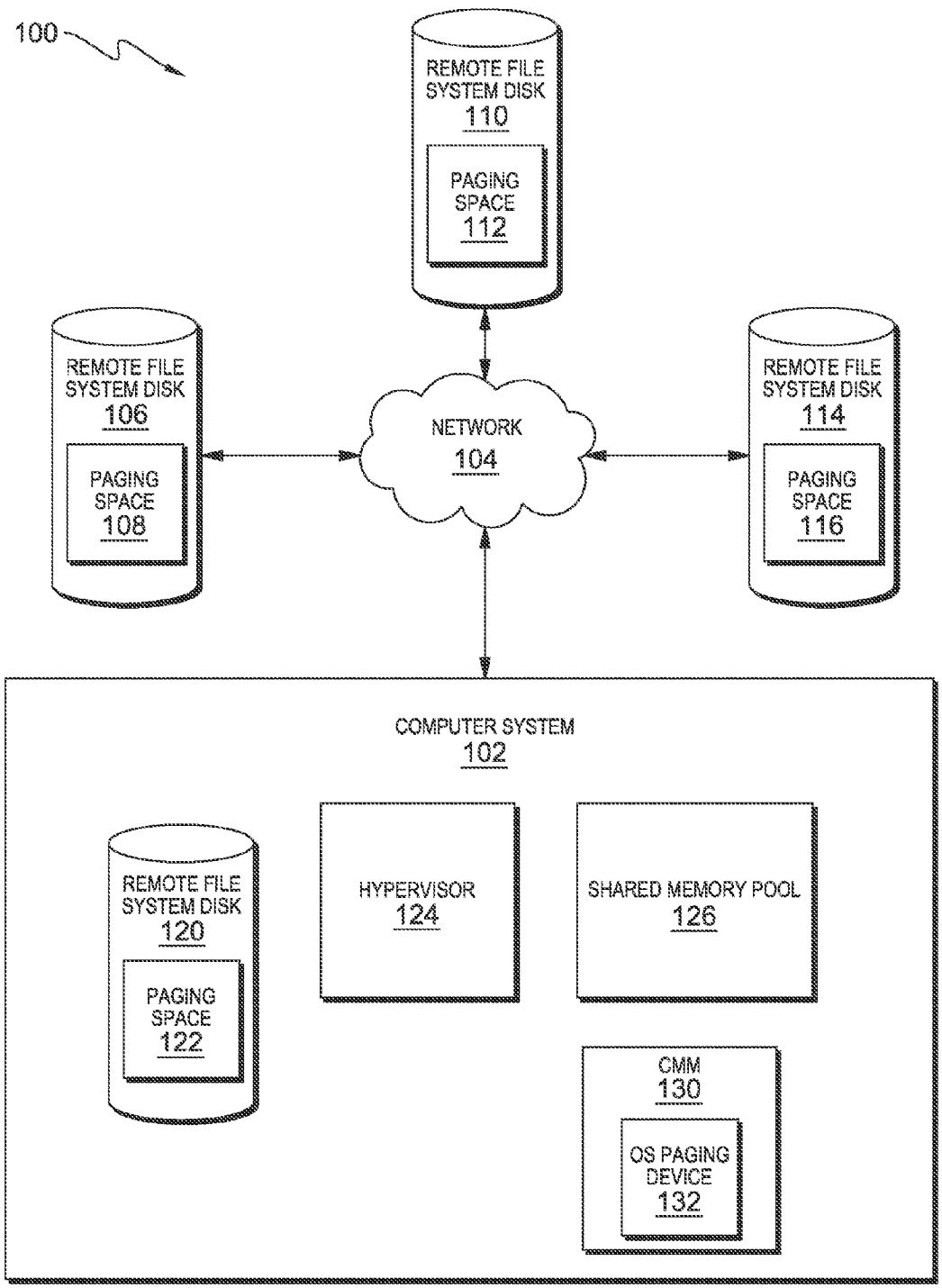
FIG. 1 is a block diagram illustrating an environment, in accordance with an embodiment of the present invention.

Embodiments of the present invention will now be described in detail with reference to the Figures. FIG. 1 is a block diagram illustrating an environment, generally designated 100, in accordance with one embodiment of the present invention.

Environment 100 includes computer system 102 and remote file system disk 106, 110 and 114, all interconnected over network 104. Network 104 can be, for example, a local area network (LAN), a wide area network (WAN) such as the Internet, or a combination of the two, and can include wired, wireless, or fiber optic connections. Network 104 may be a distributed computing environment utilizing clustered computers and components that act as a single pool of seamless resources, as is common in data centers and with cloud computing applications or "clouds". In general, network 104 can be any combination of connections and protocols that will support communications between computer system 102 and remote file system disk 106, 110, 114. For ease of discussion, reference now will only be made to remote file system disk 106 but shall include the plurality of remote file system disks 106, 110, 114, all having the same characteristics.

In various embodiments of the present invention, computer system 102 may be a laptop computer, tablet computer, netbook computer, personal computer (PC), a desktop computer, a personal digital assistant (PDA), a smart phone, or any programmable electronic device capable of communicating with remote file system disk 106 via network 104. Computer system 102 includes remote file system disk 120, hypervisor 124, shared memory pool 126 and collaborative memory manager (CMM) 130.

Remote File system disk 120 is a computer-readable storage media that includes a file system (not shown) that is used to control how data is stored and retrieved. The file system is program responsible for organizing files and directories, and keeping track of which areas of the media belong to which file and which areas are not being used. In an embodiment, remote file system disk 120 is a magnetic hard disk drive. Alternatively, or in addition to a magnetic hard disk drive, remote file system disk 120 can include a solid state hard drive, a semiconductor storage device, read-only memory (ROM), erasable programmable read-only memory (EPROM), flash memory, or any other computer-readable storage media that is capable of storing program instructions or digital information. In yet another alternative, remote file system disk 120 is persistent storage 408, discussed later.

Remote File system disk 120 includes paging space 122. Paging space 122 is a type of logical volume with allocated disk space from remote file system disk 120 that stores information that corresponds to an area mapped in virtual memory but is not currently being accessed by main memory. In an embodiment, main memory is RAM 414. In an alternative embodiment, main memory may be dedicated to a LPAR or shared between LPARS (Active Memory Shared Pool). This logical volume has an attribute type equal to paging, wherein paging is one of the memory management schemes by which a computer can store or retrieve data from secondary storage for use in main memory, and is usually simply referred to as paging space or swap space. When the amount of free main memory in computer system 102 is low, programs or data that have not been used recently are moved from main memory to paging space 122 to release main memory for other activities.

Hypervisor 124 provides the ability to divide physical computing system resources into isolated logical partitions. In an embodiment, hypervisor 124 manages shared memory pool 126. Logical partitioning is the ability to logically divide a real, or physical, resource into two or more independent resources, and one or more applications execute in each virtual machine or logical partition as if the virtual machine or logical partition was a separate physical computer. Each logical partition, also called a virtual system, virtual server, or virtual machine, operates like an independent computing system running its own operating system. Hypervisor 124 can allocate dedicated processors, I/O adapters, and memory to each virtual machine and can also allocate shared processors to each virtual machine. In some manners of virtualization, the hypervisor 124 creates a shared processor pool from which hypervisor 124 allocates time slices of virtual processors to the virtual machines according to predetermined allocation percentages. In other words, hypervisor creates 124 virtual processors from physical processors so that virtual machines can share the physical processors, which includes sharing cache space and memory bandwidth, while running independent operating environments.

Shared memory pool 126 is a collection of physical memory blocks that are managed as a whole by hypervisor 124. Shared memory pool 126 is shared by multiple paging spaces, for example paging space 122, and used to move applications or data from main memory to any number of paging spaces, or vice versa. For example, a page may be moved from main memory to paging space 122 and this operation involves moving the page from main memory to shared memory pool 126 and then to paging space 122. At the same time, a page may be moved from paging space 108 to main memory and this operation involves moving the page from paging space 108 to shared memory pool 126 and then to main memory. In an alternative embodiment, these two operations may happen directly before or after one another and the same physical memory blocks in shared memory pool 126 may be used. In other words, each paging space can use the same physical memory blocks.

In an embodiment, shared memory pool 126 is allocated physical memory blocks from RAM 414. In an alternative embodiment, shared memory pool 126 is allocated physical memory blocks from file system disk 120. In yet another embodiment, shared memory pool 126 is allocated physical memory blocks from its own separate computer-readable storage medium (not shown). The size of shared memory pool 126 can be dynamically changed at any time by CMM 130. Shared memory pool 126 can grow up to the maximum system memory available for logical partition use, in other words the maximum size of the computer-readable storage medium being used, and can be reduced to release additional memory to other memory partitions of the computer-readable storage medium. Shared memory pool 126 is used to move applications or data from main memory to paging space 122, or any other paging space, or vice versa.

CMM 130 is an operating system program that provides hints about memory page usage to hypervisor 124 so that hypervisor can target pages to swap in or out of main memory. CMM 130 also includes OS paging device 132. In an alternative embodiment, CMM 130 is an operating system feature or function. CMM 130 is designed to manage shared memory pool 126 across all partitions or paging spaces that have use of shared memory pool 126. However, CMM 130 does not have a view of the hot (active) and cold (aged) paging space 122 of file system disk 120 or any paging space(s) of any storage media(s). OS paging device 132, an operating system feature or function, notifies CMM 130 of hotness or coldness of pages found in paging space 122 or any other paging space found in environment 100. For example, paging space 108, 112, 116 found on remote file system disk 106, 110, 114, respectively. CMM 130 uses the information provided by OS paging device 132 to provide hints, discussed previously, to hypervisor 124 to target memory pages for swap in increasing order of importance based on the hints.

Figure 4:
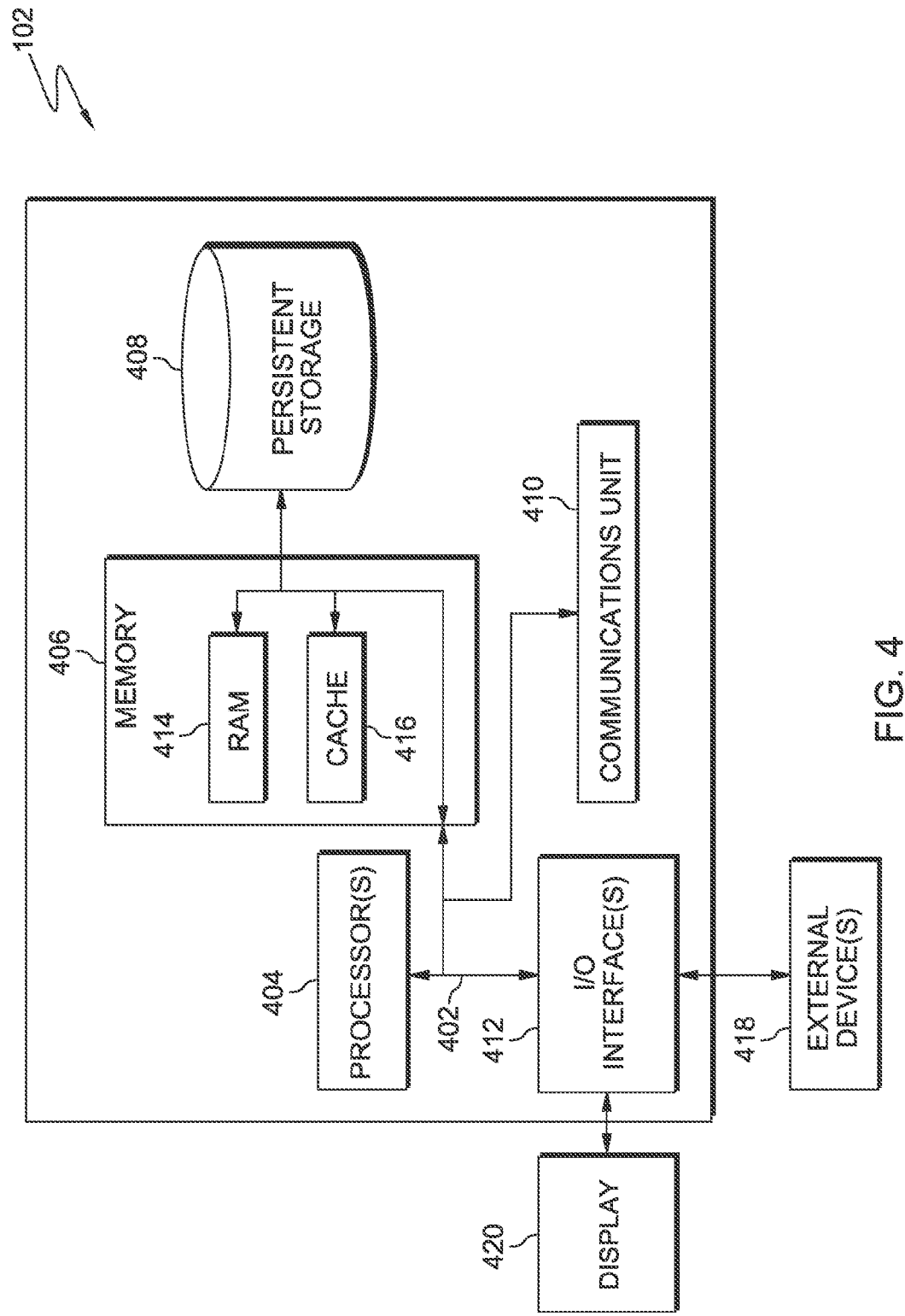
FIG. 4 depicts a block diagram of components of the computer system executing the program function, in accordance with an embodiment of the present invention.

Computer system 102 may include internal and external hardware components, as depicted and described in further detail with respect to FIG. 4.

FIG. 2 shows paging device table entry 200 and an example of potential paging device table entry in accordance with an embodiment of the present invention. Each paging device table entry 200 will have an associated OS paging device, such as OS paging device 132 and an associated paging space, such as paging space 122. Paging device table entry 200 is stored in the paging device table entry's associated paging space, such as paging space 122. It should be noted that paging device table entry 200 is being used as an example, the location of the description information found on paging device table entry 200 is an embodiment of the present invention, and all description information may be found at any location within paging device table entry 200. There are several types of page tables including an inverted page table, multilevel page table, virtualized page table, and nested page table. OS paging device 132 updates all the descriptions, as described below, when paging device table entry 200 is created or modified.

The first description is for the type of device. For example, log, paging, remote file system, or local file system. There can be any number of log, paging, remote file systems, or local file systems and each can be named individually. The second description is for the pending input/output (i/o) count. The pending i/o count is total number of input/output, e.g., read/write operations for the paging device. The count is dynamically changing as more input/output operations are completed and/or added to the queue. The third description is for the i/o list head. The i/o list head is the first operation listed in the pending i/o count. In other words, the i/o list head is the next operation to be input/output. When this operation has been completed there is a new i/o list head that is the next operation to be input/output. The fourth description is for the i/o list tail. The i/o list tail is the last operation listed in the pending i/o count. In other words, the i/o list tail is the last operation to be input/output. When a new operation is added to the pending i/o count, the new operation becomes the i/o list tail. The fifth description is the pager strategy routine address. The pager strategy routine address is a function that is registered to a specified I/O sub system within the operating system. An example would be the NFS having its own strategy to sync NFS pages to NFS server. The operating system stores the address of the specified device during initialization of the I/O subsystem pertaining to the specified device in paging device table entry 200. When an I/O request is made, the operating system invokes the paging strategy of the specified device as indicated in paging device table entry 200.

In an embodiment of the invention, paging device table entry 200 also includes readable residences, writeable residences, intermediate arrival count just to page out, and varying residence. The first description is readable residences and indicates the number of locations that a page can be read from. The second description is writeable residences and indicates the number of locations that a page can be written to. The third description is intermediate arrival count just to page out and indicates whether a page, when being paged or swapped out, must arrive at an intermediate location, in this embodiment shared memory pool 126. The fourth description is varying residence and indicates that the number of residences for a page pertaining to this paging device table entry dynamically changes.

Figure 3:
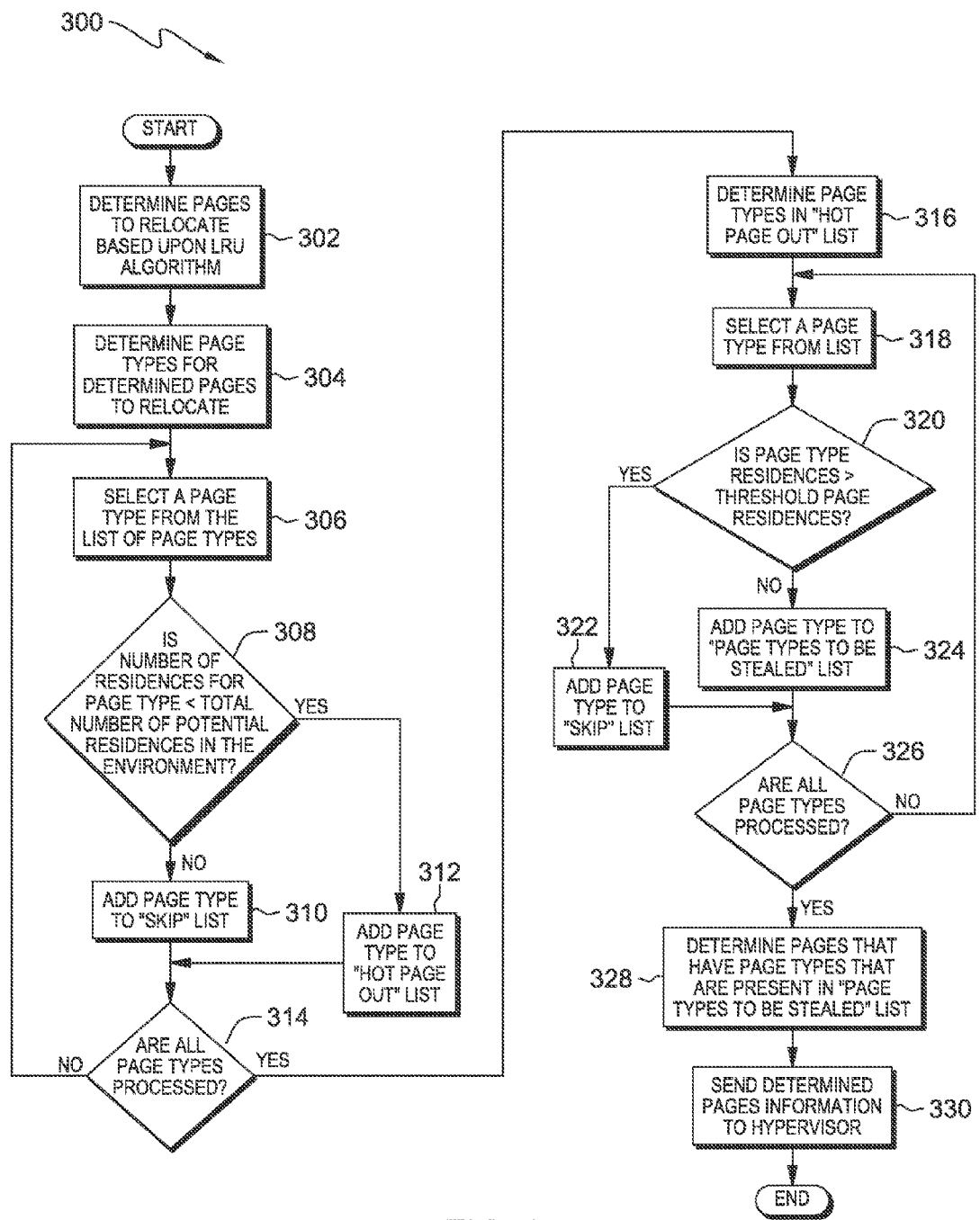
FIG. 3 is a flowchart depicting the operational steps of a program function, on a computer system within the environment of FIG. 1, in accordance with an embodiment of the present invention.

FIG. 3 is a flowchart depicting workflow 300 which includes operational steps of CMM 130 for providing hints to hypervisor 124 for page stealing by categorizing page types based upon the number of residences, in accordance with an embodiment of the present invention.

CMM 130 determines pages to relocate based upon least recently used (LRU) algorithm (step 302). Here, a program tries to access a page(s) that are not currently mapped to main memory. This situation is known as a page fault. CMM 130 then takes control to handle the page fault, in a manner invisible to the original program that is trying to access the page. Therefore, CMM 130 must determine the location of the page that is trying to be accessed in secondary storage, for example, on file system disk 120. The page may be found on file system disk 120 or directly in paging space 122 located on file system disk 120. Secondary storage may also be remote file system disk 106, 110, 114, and the associated paging space 108, 112, 116, respectively. Next, CMM 130 must obtain an empty page from main memory to use as the container for the retrieved page to be located.

To obtain an empty page from main memory, CMM 130 must relocate a page that is located in main memory and to determine which page to relocate, CMM 130 uses a LRU algorithm. The LRU algorithm determines the least recently used page as the page to relocate first. This algorithm requires keeping track of what was used when. In an alternative embodiment, CMM 130 may use Bélády's algorithm, most recently used (MRU) algorithm, pseudo-LRU (PLRU) algorithm, random replacement (RR) algorithm, segmented LRU (SLRU) algorithm, or any other algorithm as known in the art and suitable for the foregoing intended use. CMM 130 will determine a number of pages that are potential candidates for hinting to hypervisor 124 to be taken from main memory to handle the page fault.

CMM 130 determines the page types for the determined pages to relocated (step 304). CMM 130 performs an analysis of all the pages that have been determined, in the previous step, as possible candidates to relocate and creates a list of all of the page types found in all the pages. In other words, there may be a total of seven pages but there may only be four page types from the seven pages. The possible page types include, but are not limited to, Klock (Kernel pages), working segment pages, remote pages (e.g., networked file system or short-term network file system), and persistent pages. For example, there may be three working segment pages, two persistent pages, two remote networked file system pages and a single remote short-term network file system page.

CMM 130 selects a page type from the list of page types (step 306). As discussed in the previous step, there are a number of page types for the pages that have been determined as potentials to be swapped, and step 306 is the first step in a loop that will analyze each page type. The page type to be analyzed can be determined by a user input. In other words, a user can select a page type to analyze first, second, third, etc. until all page types have been put in an order of analysis. In an alternative embodiment, a user or administrator may notify CMM 130 of a predetermined order of page types to analyze. In doing so, CMM 130 performs this step without input from a user during the analysis process. For example, CMM 130 selects working segment pages as the first page type to analyze due to a predetermined ordering of page types to analyze.

CMM 130 determines if the number of residences for the page type is less than the total number of potential residences for all pages in the environment (decision block 308). The number of residences for the page type is determined from the paging device table entry for that page type by taking the sum of the readable residences and writeable residences. In an embodiment, environment 100 includes a total of six potential residences: paging space 108, 112, 116, 122, shared memory pool 126, and main memory. Alternatively, there may be any number of potential residence for all pages in the environment.

If the number of residences for the page type is more than the total number of potential residences for all pages in the environment (decision block 308, no branch), then CMM 130 adds the page type to the "Skip" list (step 310). The "Skip" list (not shown) is a list of the page types that CMM 130 has determined should not be hinted to hypervisor 124 as potential candidates to be swapped. If the number of residences for the page type is less than the total number of potential residences for all pages in the environment (decision block 308, yes branch), then CMM 130 adds the page type to the "Hot Page Out" list (step 312). The "Hot Page Out" list (not shown) is a list of the page types that CMM 130 has determined can be hinted to hypervisor 124 as potential candidates to be swapped.

Upon completion of either step 310 or step 312, CMM determines if all page types, from the list of page types, have been processed (decision block 314). If all page types have not been processed (decision block 314, no branch), then CMM 130 selects another page type from the list of page types to process (step 306).

If all page types have been processed (decision block 314, yes branch), then CMM 130 determines the page types in the "Hot Page Out" list (step 316). Similar to step 304, CMM 130 performs an analysis of all the page types that have been added to "Hot Page Out" list as possible candidates to relocate and creates a list of all the pages that are possible candidates to relocate. In other words, there may be three page types but a total of five pages that are potential pages to be relocated.

CMM 130 selects a page type from the list of determined page types (step 318). As discussed in the previous step, there are a number of page types for the pages that have been determined as potentials to be swapped, and step 318 is the first step in a loop that will analyze each page type. For example, CMM 130 selects working segment pages as the first page type to analyze.

CMM 130 determines if the number of residences for the page type is greater than the threshold page residences (decision block 320). The number of residences for the page type is determined from the paging device table entry for that page type by taking the sum of the readable residences and writeable residences. In an embodiment, the threshold page residences is determined by the administrator of environment 100. In an alternative embodiment, the threshold page residences may be determined by the OS. For example, the administrator may determine the threshold page residences is three page residences.

If the number of residences for the page type is more than the threshold page residences (decision block 320, yes branch), then CMM 130 adds the page type to the "Skip" list (step 322). The "Skip" list (not shown) is a list of the page types that CMM 130 has determined should not be hinted to hypervisor 124 as potential candidates to be swapped, as discussed previously. If the number of residences for the page type is less than the threshold page residences (decision block 320, no branch), then CMM 130 adds the page type to the "Page Types to be Stealed" list (step 324). The "Page Types to be Stealed" list (not shown) is a list of the page types that CMM 130 has determined will be hinted to hypervisor 124 as potential candidates to be swapped.

Upon completion of either step 322 or step 324, CMM determines if all page types, from the list of page types, have been processed (decision block 326). If all page types have not been processed (decision block 326, no branch), then CMM 130 selects another page type from the list of page types to process (step 318).

If all page types have been processed (decision block 326, yes branch), then CMM 130 determines the page that have page types present in the "Page Types to be Stealed" list (step 328). In other words, CMM 130 reviews the pages determined to be relocated in step 302, and then determines which of those pages have page types present in the "Page Types to be Stealed" list. For example, only one page type may be present in the "Page Types to be Stealed" list and there may be two pages that have been determined as potential candidates to be relocated that are of that page type.

CMM 130 sends the determined pages information to hypervisor 124 (step 330). CMM 130 provides hypervisor 124 with hints about the determined pages that can be stealed. In other words, CMM 130 has found more optimal candidate pages to be swapped as compared to just using algorithms, as discussed in step 302, and CMM 130 notifies hypervisor 124 of the optimal candidate pages. Hypervisor 124 now performs standard swapping operations with the information about optimal candidates, as known in the art.

FIG. 4 depicts a block diagram of components of computer system 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

A non-transitory computer readable storage medium embodiment herein is readable by a computerized device. The non-transitory computer readable storage medium stores instructions executable by the computerized device to perform a method that tests integrated circuit devices to measure a voltage overshoot condition.

Computer system 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Hypervisor 124 and CMM 130 may be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including remote file system disk 106, 110, 114. In these examples, communications unit 410 includes one or more network interface cards. Communications unit 410 may provide communications through the use of either or both physical and wireless communications links. Hypervisor 124 and CMM 130 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., hypervisor 124 and CMM 130, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for providing hints for page stealing by prioritizing pages based on the number of residences for the pages in a virtual environment comprising:

one or more computer readable non-transitory storage media;

program instructions stored on the one or more computer readable non-transitory storage media, the program instructions comprising:

program instructions to receive a plurality of pages that are candidates to be hinted to a hypervisor for page stealing;

program instructions to determine at least two page types from the plurality of pages, wherein the page type include at least one of Klock (Kernel pages), working segment pages, remote pages, and persistent pages;

program instructions to determine whether any of the at least two page types have a total number of residences less than a total number of potential residences in a virtual environment for all page types and have a total number of residences less than a threshold, wherein the threshold is determined by a user of the virtual environment in real time, and wherein the total number of potential residences is the sum of readable residences and writeable residences, and wherein the total number of residences include a paging space, a shared memory pool, and a main memory, and wherein the paging space comprises paging space found on a computer that hosts the hypervisor; and program instructions, responsive to determining a first page type of the at least two page types has a total number of residences less than a total number of potential residences in the virtual environment for all page types and has a total number of residences less than a threshold, to notify the hypervisor of at least one page, from the plurality of pages, that is of the first page type, and wherein the notification includes an indication that the at least one page is an optimal candidate for page stealing.

* * * * *